United States Patent
Anghel et al.

(10) Patent No.: US 8,198,743 B2
(45) Date of Patent: Jun. 12, 2012

(54) MULTI-STAGE CONTROLLED FREQUENCY GENERATOR FOR DIRECT-DRIVE WIND POWER

(75) Inventors: Cristian Anghel, Oro Valley, AZ (US); Ming Xu, Oro Valley, AZ (US); Parsa Mirmobin, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 320 days.

(21) Appl. No.: 12/640,340

(22) Filed: Dec. 17, 2009

(65) Prior Publication Data
US 2011/0062710 A1    Mar. 17, 2011

Related U.S. Application Data

(60) Provisional application No. 61/241,729, filed on Sep. 11, 2009.

(51) Int. Cl.
*F03D 9/00* (2006.01)
*H02P 9/04* (2006.01)

(52) U.S. Cl. .................................... 290/44; 290/55
(58) Field of Classification Search ............... 290/44, 290/55
See application file for complete search history.

(56) References Cited

U.S. PATENT DOCUMENTS

| | | | | |
|---|---|---|---|---|
| 4,229,689 A * | 10/1980 | Nickoladze | | 322/32 |
| 4,246,531 A * | 1/1981 | Jordan | | 322/28 |
| 4,305,001 A * | 12/1981 | Vamaraju et al. | | 290/5 |
| 4,625,160 A * | 11/1986 | Hucker | | 322/32 |
| 4,701,691 A * | 10/1987 | Nickoladze | | 322/32 |
| 4,780,659 A * | 10/1988 | Bansal et al. | | 322/58 |
| 4,806,841 A * | 2/1989 | Lee et al. | | 322/29 |
| 4,965,477 A * | 10/1990 | Stadler et al. | | 310/114 |
| 5,023,537 A * | 6/1991 | Baits | | 318/732 |
| 5,254,894 A * | 10/1993 | Satake et al. | | 310/114 |
| 5,274,291 A * | 12/1993 | Clarke | | 310/112 |
| 5,418,446 A * | 5/1995 | Hallidy | | 322/28 |
| 5,708,314 A * | 1/1998 | Law | | 310/114 |
| 5,739,612 A * | 4/1998 | Davenport | | 310/113 |
| 5,850,138 A * | 12/1998 | Adams et al. | | 322/68 |
| 6,072,303 A * | 6/2000 | Nickoladze et al. | | 322/20 |
| 6,486,640 B2 * | 11/2002 | Adams | | 322/59 |
| 6,768,278 B2 * | 7/2004 | Xu et al. | | 318/140 |
| 6,909,263 B2 * | 6/2005 | Xu et al. | | 322/29 |
| 7,064,455 B2 * | 6/2006 | Lando | | 290/1 C |
| 7,071,657 B2 | 7/2006 | Tupper et al. | | |
| 7,230,358 B2 * | 6/2007 | Smith | | 310/114 |
| 7,514,806 B2 * | 4/2009 | Xu et al. | | 290/31 |
| 7,615,904 B2 * | 11/2009 | Tupper et al. | | 310/179 |

(Continued)

FOREIGN PATENT DOCUMENTS
WO    WO 2009 103994 A2    8/2009

*Primary Examiner* — Pedro J Cuevas
(74) *Attorney, Agent, or Firm* — Shimokaji & Assoc., PC

(57) ABSTRACT

A multi-sage controlled frequency generator is described that has a low size, weight and cost. The new generator requires an electronic controller that requires only 25% of the total generated power (100%) when the generator shaft speed varies by +/−25% around its synchronous speed. The shaft driving the generator in the direct-drive controlled frequency generator may be moved at a variable speed. The output frequency of the generator may be controlled by electrically controlling the frequency of the first stator stage and by selecting the control frequency, the number of poles, and the number of stages, such that the output of the last stage will be maintained constant at the desired grid frequency.

18 Claims, 10 Drawing Sheets

U.S. PATENT DOCUMENTS

| | | | |
|---|---|---|---|
| 7,687,928 B2* | 3/2010 | Taneja et al. | 290/36 R |
| 7,863,868 B2* | 1/2011 | Xu et al. | 322/44 |
| 8,076,814 B2* | 12/2011 | Tupper et al. | 310/179 |
| 8,085,004 B2* | 12/2011 | Xu et al. | 322/59 |
| 8,097,968 B2* | 1/2012 | Anghel et al. | 290/31 |
| 8,121,738 B2* | 2/2012 | Teichmann et al. | 700/287 |
| 2003/0052565 A1* | 3/2003 | Nickoladze et al. | 310/198 |
| 2004/0027077 A1* | 2/2004 | Xu et al. | 318/107 |
| 2004/0027078 A1* | 2/2004 | Xu et al. | 318/107 |
| 2004/0041480 A1* | 3/2004 | Nickoladze et al. | 310/112 |
| 2004/0080300 A1* | 4/2004 | Xu et al. | 322/59 |
| 2005/0116566 A1* | 6/2005 | Nickoladze et al. | 310/112 |
| 2005/0194941 A1* | 9/2005 | Tupper et al. | 322/29 |
| 2005/0225303 A1* | 10/2005 | Xu et al. | 322/59 |
| 2006/0145553 A1* | 7/2006 | Nickoladze et al. | 310/112 |
| 2006/0249956 A9* | 11/2006 | Thomson et al. | 290/34 |
| 2007/0222220 A1* | 9/2007 | Huang et al. | 290/31 |
| 2007/0262670 A1* | 11/2007 | Nickoladze et al. | 310/112 |
| 2008/0023966 A1* | 1/2008 | Kumar | 290/40 |
| 2008/0088200 A1* | 4/2008 | Ritchey | 310/268 |
| 2008/0150384 A1* | 6/2008 | Nickoladze et al. | 310/112 |
| 2008/0303280 A1* | 12/2008 | Xu et al. | 290/31 |
| 2008/0303490 A1* | 12/2008 | Xu et al. | 322/29 |
| 2009/0121482 A1* | 5/2009 | Rickard | 290/44 |
| 2010/0090553 A1* | 4/2010 | Ritchey | 310/114 |
| 2010/0308581 A1* | 12/2010 | Anghel et al. | 290/31 |
| 2011/0068753 A1* | 3/2011 | Xu et al. | 322/32 |
| 2011/0140560 A1* | 6/2011 | Nickoladze et al. | 310/112 |
| 2012/0014797 A1* | 1/2012 | Hehenberger | 416/170 R |
| 2012/0014798 A1* | 1/2012 | Hehenberger | 416/170 R |
| 2012/0029892 A1* | 2/2012 | Thulke | 703/7 |
| 2012/0032443 A1* | 2/2012 | Hehenberger | 290/44 |
| 2012/0038156 A1* | 2/2012 | Hehenberger | 290/44 |
| 2012/0049807 A1* | 3/2012 | Hehenberger | 322/40 |

* cited by examiner

MULTI-STAGE CONTROLLED FREQUENCY GENERATOR FOR DIRECT-DRIVE WIND POWER

CROSS-REFERENCE TO RELATED APPLICATIONS

This application claims benefit under 35 USC 119(e) to provisional application No. 61/241,729, filed Sep. 11, 2009, herein incorporated by reference.

BACKGROUND OF THE INVENTION

The present invention generally relates a controlled frequency generator and, more specifically, to a multi-stage controlled frequency generator for direct-drive wind power.

Wind power is a fast growing renewable energy source. Various wind turbine concepts have been developed with the goal of maximizing the energy harnessed, while minimizing the installation and operation costs and providing utility grid equivalent electrical power quality. Such turbine concepts can be classified into geared and direct-drive systems.

FIG. 1 shows a functional block diagram of a conventional geared system 100. The major components of the geared system 100 include a wind turbine 102, a generator 104, a power converter 106, and a gearbox 108. Typically the generator 104 used in geared systems are of the doubly-fed (induction) machine type (DFM). The power converter 106 required to control this type of machine has to be rated at approximately 25% of the total generated power when the generator shaft speed varies by +/−33% around its synchronous speed.

FIG. 2 shows a functional block diagram of a conventional direct-drive system 200. The major components of the direct-drive system 200 include a wind turbine 202, a generator 204, and a power converter 206. Typically the generator 204 used in direct drive systems are synchronous generators (SG) either with wound rotor electrically excited or with permanent magnets. The power converter 206 required to connect these types of generators to the grid has to be rated at 100% of the total generated power.

In conventional wind power systems, referring back to FIG. 1, the gearbox 108 connects a low-speed shaft 110 moved by the blades of the turbine 102 to a high-speed shaft 112, thereby increasing the rotational speed from approximately 15-25 rotations per minute (rpm) to about 1000-1700 rpm at the generator shaft (high speed shaft 112). These values are typical for larger wind turbines over a megawatt (MW).

Over 20 years, the direct-drive generator 204 makes the same number of rotations that the generator 104 of the geared system 100 makes in about 16 weeks, resulting in significant reliability and operational life increase of the direct-drive generator system 200, before considering the additional moving parts in the gearbox 108. More significantly, the stress levels within the gearbox 108 of the geared system 100 may contribute to gearbox failure, especially when the effects of wind turbulence are considered.

Direct-drive generators constitute the state of the art of the industry because they eliminate the wind turbulence driven gearbox stresses. Because of the high torque and very low shaft speed (15 to 25 rpm) they are very large, heavy and expensive. The low speed operation of direct-drive wind power systems dictates a large number of rotor poles in the generator. This high number of rotor poles significantly increases the size, weight and cost of the generator. Literature shows that a 2 MW direct drive generator has a weight of about 48 tons.

Conventional direct-drive generators may also lack the ability to control the output frequency at 60 Hz. They typically have a low frequency of about 10 Hz. An electronic power controller (power converter) rated to convert all the power supplied by the generator is required to provide usable, utility quality power, that is connectable to the power grid. The large electronic controller adds significant cost and weight to the wind turbine system.

As can be seen, there is a need for a controlled frequency generator for direct-drive wind power.

SUMMARY OF THE INVENTION

In one aspect of the present invention, a direct-drive controlled frequency generator comprises at least two stages electrically interconnected to control an output frequency of the generator; wherein the generator has a shaft with a variable speed and the frequency at the output of the generator is controlled electrically using only a fraction of the total output power.

In another aspect of the present invention, a wind powered electricity generation apparatus comprises a wind turbine driving a generator shaft; a generator having at least two generator stages having rotors rotationally attached to the generator shaft; and an output from the generator connected directly to a power grid.

In a further aspect of the present invention, a method for the generation of controlled frequency power comprises driving an input shaft of a generator with a wind turbine without a gearbox, wherein the generator includes at least two electrically connected stages; generating power with the generator; and delivering the power generated by the generator directly to a power grid.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, the present invention provides a direct-drive controlled frequency generator. By combining the advantageous performance and reliability of the direct-drive systems with a lower weight and cost similar to geared systems, the present invention may improve the implementation of generator systems for wind turbines. The shaft driving the generator in the direct-drive controlled frequency generator may be moved at a variable speed. The output frequency of the generator may be controlled by electrically controlling the frequency of the first stator stage and by selecting the control frequency, the number of poles, and the number of stages, such that the output of the last stage will be maintained constant at the desired grid frequency.

Figure 1:
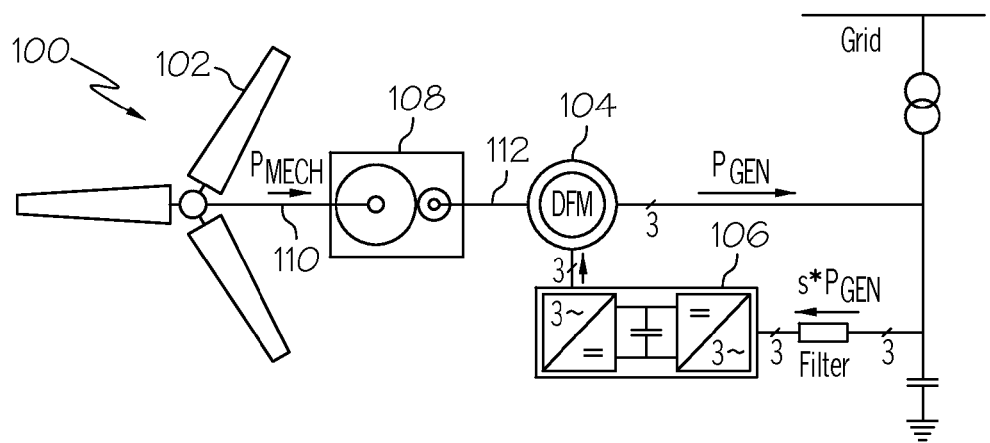
FIG. 1 is a schematic drawing of a typical geared power generation system according to the prior art.
Figure 2:
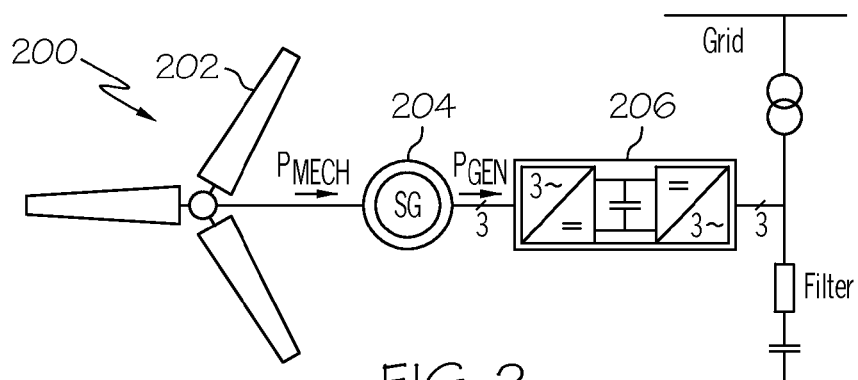
FIG. 2 is a schematic drawing of a typical direct-drive power generation system according to the prior art.
Figure 3:
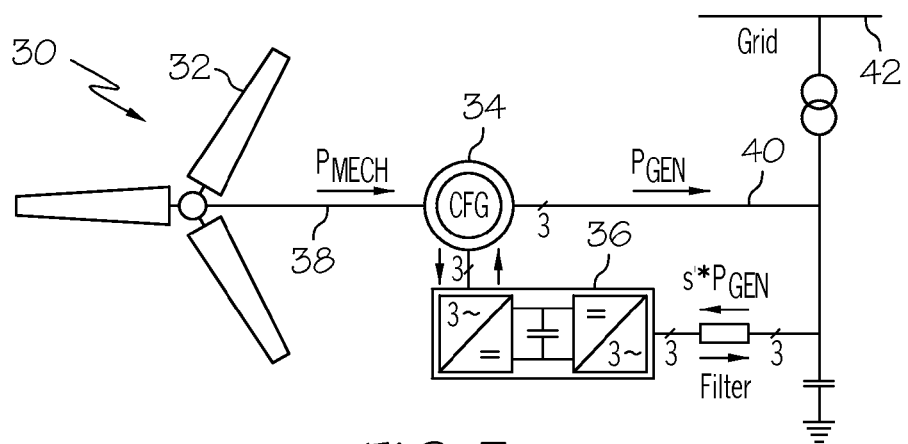
FIG. 3 is a schematic drawing of a direct-drive power generation system according to an exemplary embodiment of the present invention.

A functional block diagram of a direct-drive generator system 30 according to an embodiment of the present invention is shown in FIG. 3. The major components of the direct-drive generator system 30 include a wind turbine 32, a generator 34, and a power converter 36. According to one aspect of the present invention, the direct-drive generator system 30, as described in greater detail below, may include a controlled frequency power generator that has a lower size, weight and cost as compared to the conventional direct-drive systems described above. The system 30 may require the electronic power controller 36 to control only about 25% of the generated power when the speed of a generator shaft 38 varies by +/−25% around its synchronous speed in an exemplary embodiment. An output frequency of the system 30 may be controlled at 60 Hz when the shaft speed varies from 15 rpm to 25 rpm in an exemplary embodiment. The 60 Hz constant frequency output may allow the generator output 40 to be connected directly to a power grid 42.

Typical aerospace wound field generators are brushless and consist of an exciter generator and a main generator whose rotors are connected together on a common shaft via a rotating rectifier bridge. A flux field that is 'locked' to the rotor rotation is generated by the single phase winding on the rotor. As a result its output frequency is proportional to the shaft speed and it is governed by the following relationship:

$$f=(p*n)/120$$

where f is the generator frequency, p is the pole number and n is the shaft speed in rpm.

Figure 4A:
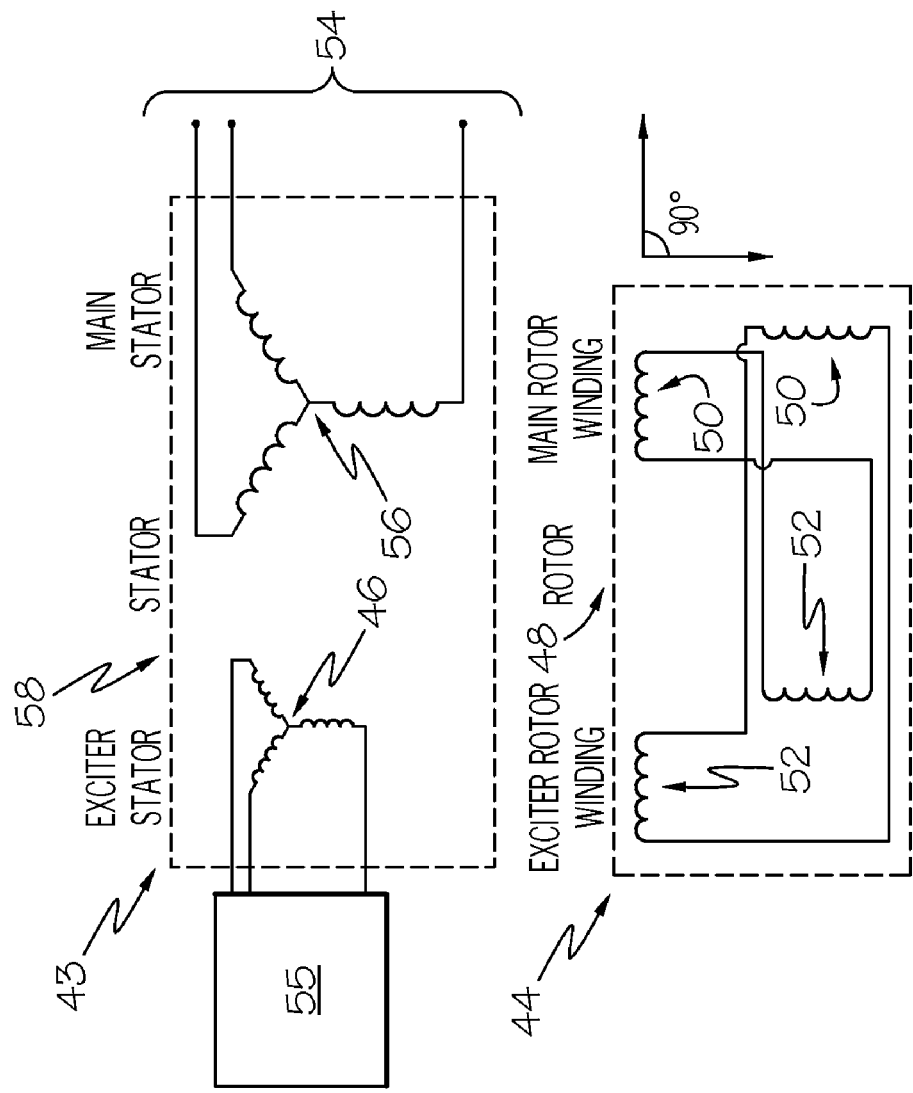
FIG. 4A is a schematic drawing of a two-stage generator with quadrature AC excitation and reversed rotor connections used in the direct-drive power generation system of FIG. 3.
Figure 4B:
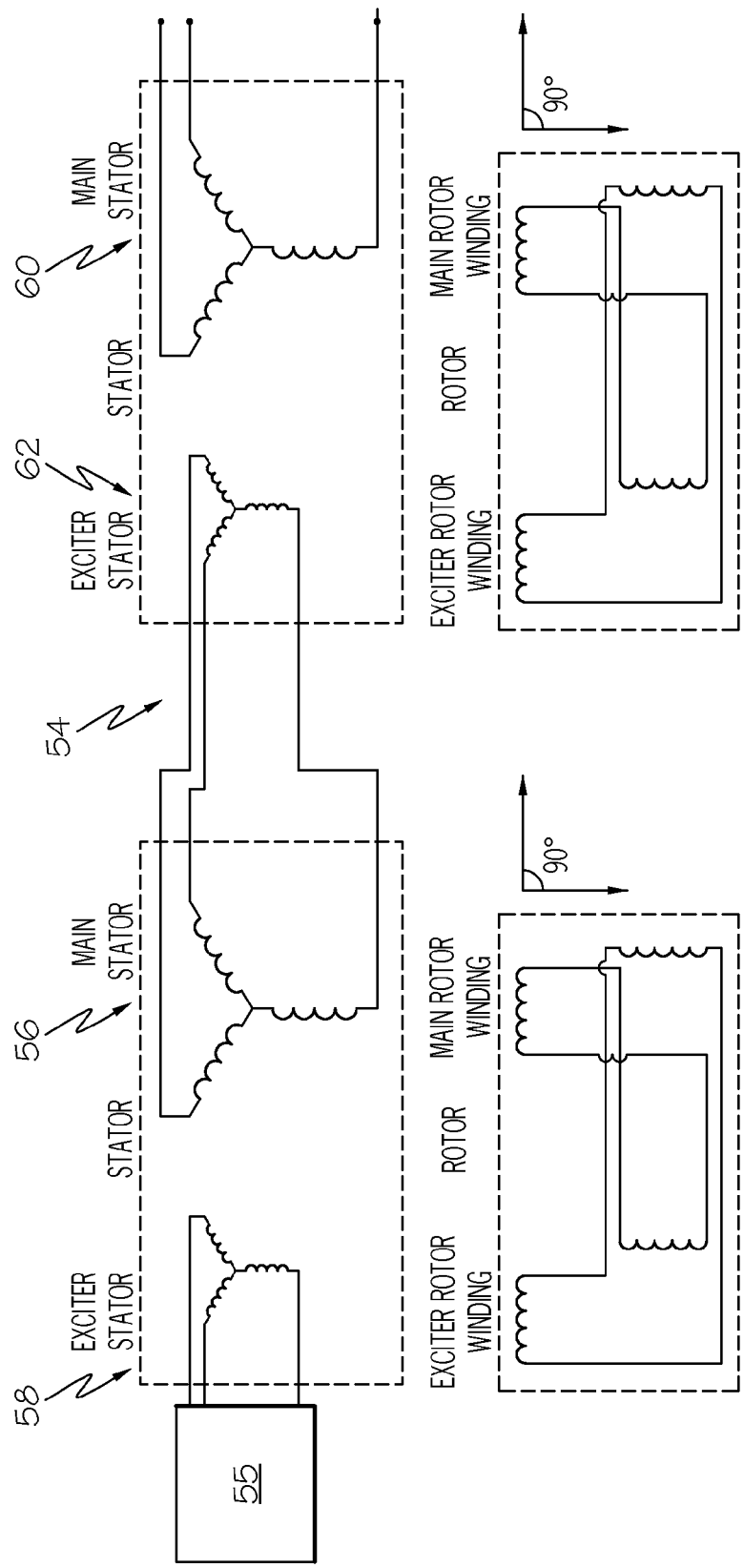
FIG. 4B is a schematic drawing of a four-stage generator with quadrature AC excitation and reversed rotor connections used in the direct-drive power generation system of FIG. 3 and showing the connections between the multiple stages.
Figure 4C:
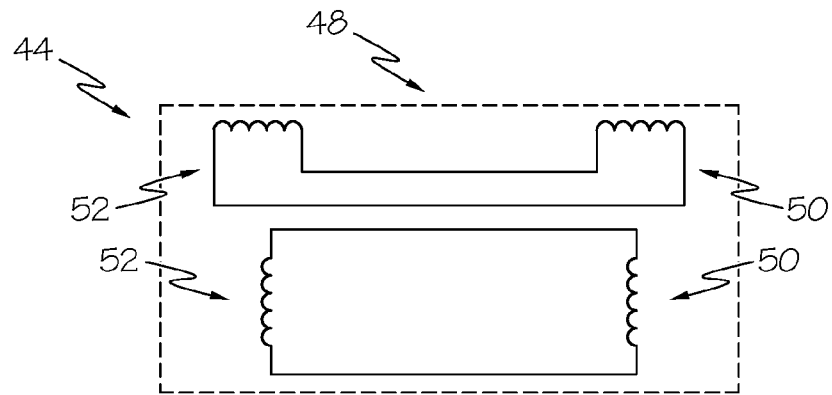
FIG. 4C is a schematic drawing of a the direct rotor connections of two-stage generator with quadrature AC excitation used in the direct-drive power generation system of FIG. 3.

According to one embodiment of the present invention, a rotor winding scheme 44 may use a plurality of windings with two phases, which are 90 degrees apart in space and 90 degrees shifted electrically. This configuration is shown in FIG. 4A. Any multiphase (2, 3, 4, 5, 6, 7, 8, 9, etc) winding configuration that can produce a rotating flux can be used. According to another embodiment of the present invention, a stator winding scheme 43 may use a plurality of windings. The rotor flux may be induced from the exciter generator stator 46 which may have its own three phases as shown in FIG. 4A. Any multiphase (2, 3, 4, 5, 6, 7, 8, 9, etc) winding configuration that can produce a rotating flux can be used for the exciter stator. Exciter generator rotor windings 52 and main generator rotor windings 50 may be connected together on a common rotor 48. The reversed connections shown in FIGS. 4A and 4B are typically used according to an embodiment of the present invention, but the direct connection shown in FIG. 4C may be used. This concept may add the exciter and the main generator frequency and, for the same number of poles and shaft speed as a generator without having the windings 52, 50 directly coupled, the output frequency may be the sum of the exciter generator frequency and the main generator frequency. If the exciter generator and the main generator have the same number of pole, which is the case of the exemplary embodiments, then the output frequency may double. In an exemplary embodiment, with four stages (58, 56, 62, 60) two such exciter and main generator stages are connected such that an output 54 of a second stage 56, i.e. its main stator windings of a common stator supplies the excitation for a third stage 62 as shown in FIG. 4B.

FIGS. 5 through 16, described in greater detail below, show two such exemplary configurations—for a 90 pole generator and for a 60 pole generator. The same frequency that would have been achieved with previous designs using 360 and, respectively, 240 rotor poles, may now be achieved by using a two-stage generator according to an embodiment of the present invention, each stage having an exciter and main generator with only 90 poles or 60 poles, respectively.

Each one of the two exemplary configurations (90 poles and 60 poles) may be controlled in a manner that may allow the resultant rotor flux to rotate at a speed that creates 60 Hz output power. The rotor flux speed may be controlled by an exciter stator 46 (see FIG. 4A) that induces a current in the rotor windings 52 of an appropriate magnitude, phasing and frequency. The exciter stator 46 may also have a plurality of windings with two or more phases and may be controlled by an electronic controller 55.

Figure 5:
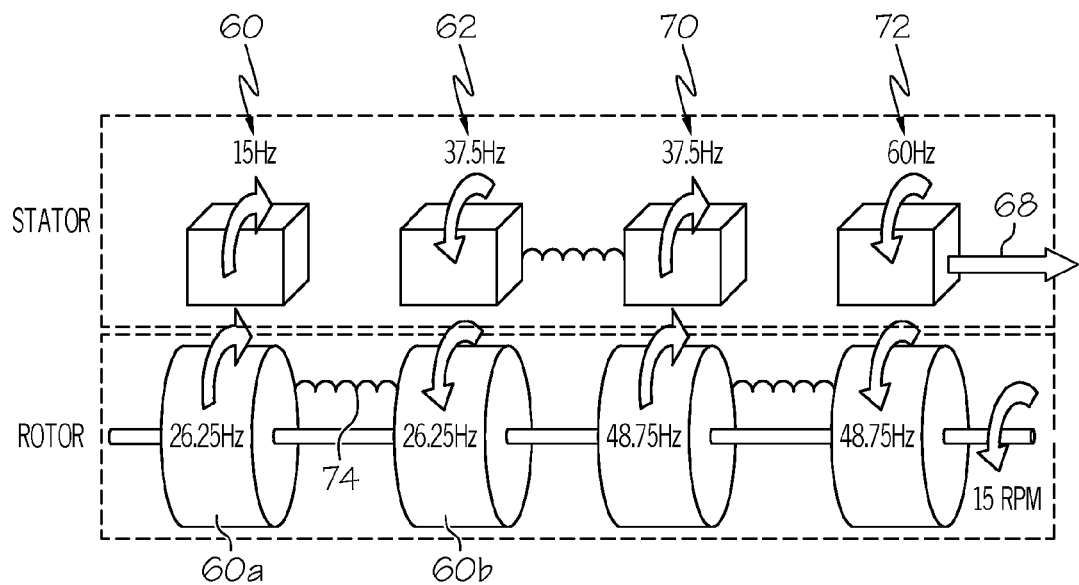
FIG. 5 is a graphical representation of showing generator frequencies through multiple stages in a power generation system having 90 poles and operating at a shaft speed of 15 rpm, according to one embodiment of the present invention.
Figure 7:
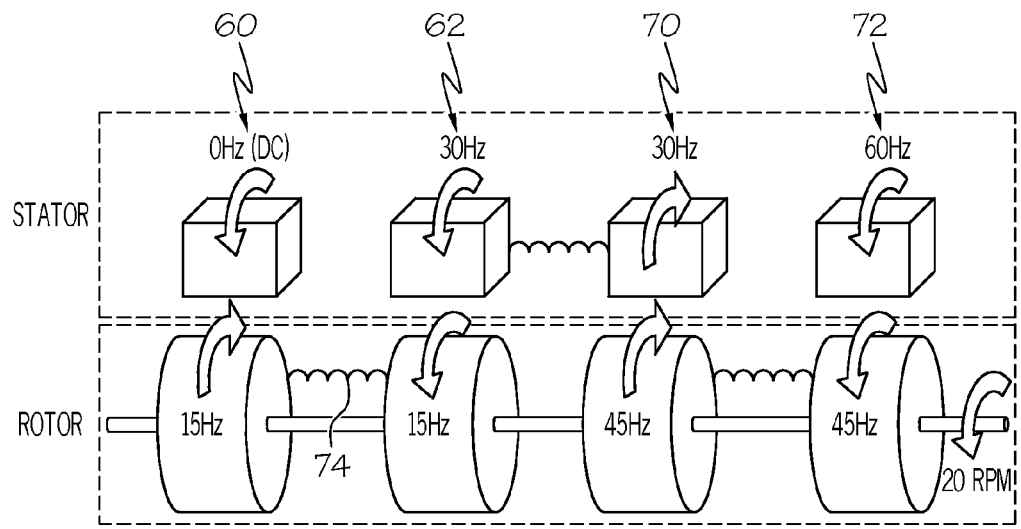
FIG. 7 is a graphical representation of showing generator frequencies through multiple stages in a power generation system having 90 poles and operating at a shaft speed of 20 rpm, according to another embodiment of the present invention.
Figure 9:
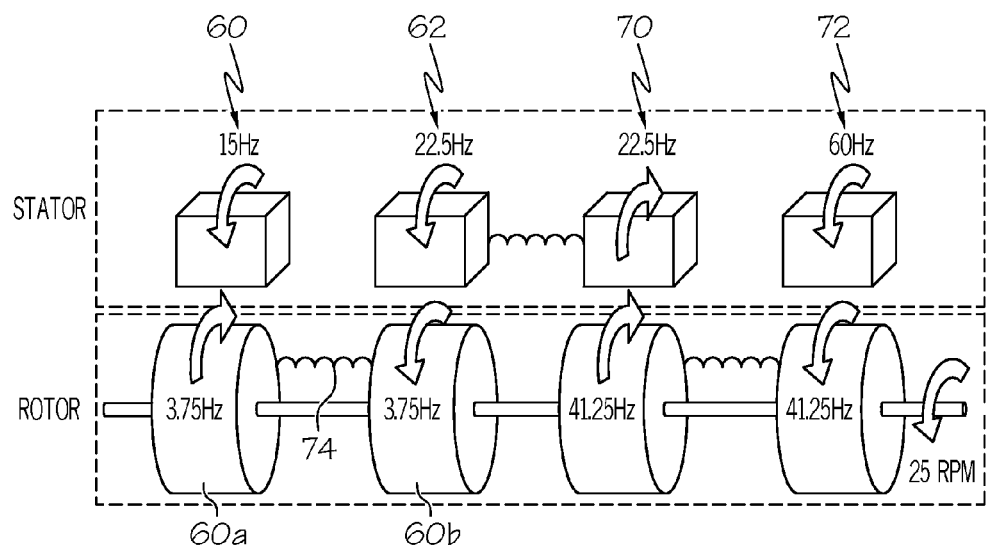
FIG. 9 is a graphical representation of showing generator frequencies through multiple stages in a power generation system having 90 poles and operating at a shaft speed of 25 rpm, according to another embodiment of the present invention.

FIGS. 5, 7 and 9 show the generator frequencies corresponding to shaft speeds of 15 rpm, 20 rpm and 25 rpm, respectively, such that, for all these speeds, the output frequency 68 at the main output of the generator may be 60 Hz. In these examples, each stage of the generator has 90 poles.

Figure 6:
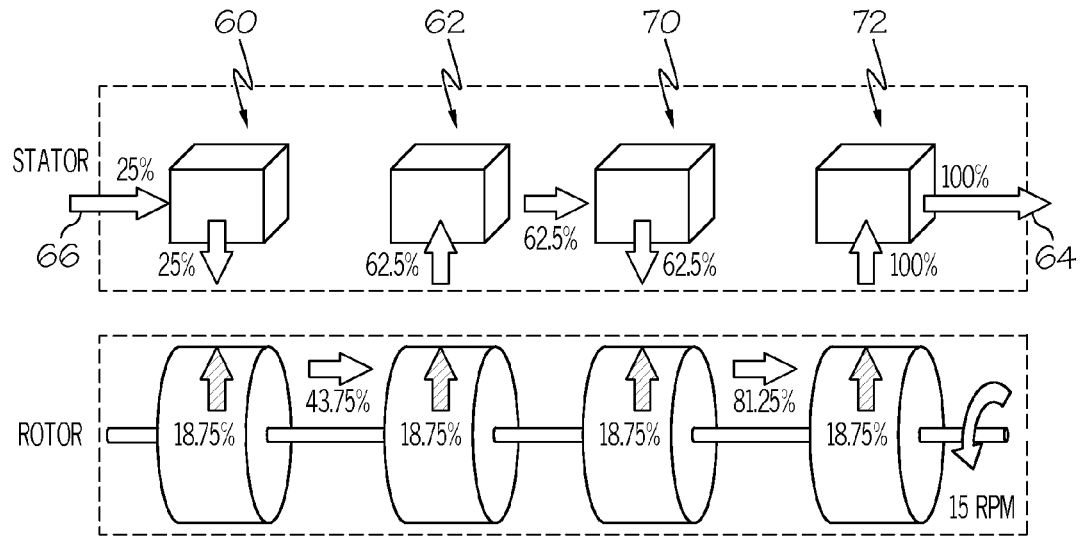
FIG. 6 is a graphical representation showing generator power flow through multiple stages in a power generation system having 90 poles and operating at a shaft speed of 15 rpm, according to another embodiment of the present invention.
Figure 8:
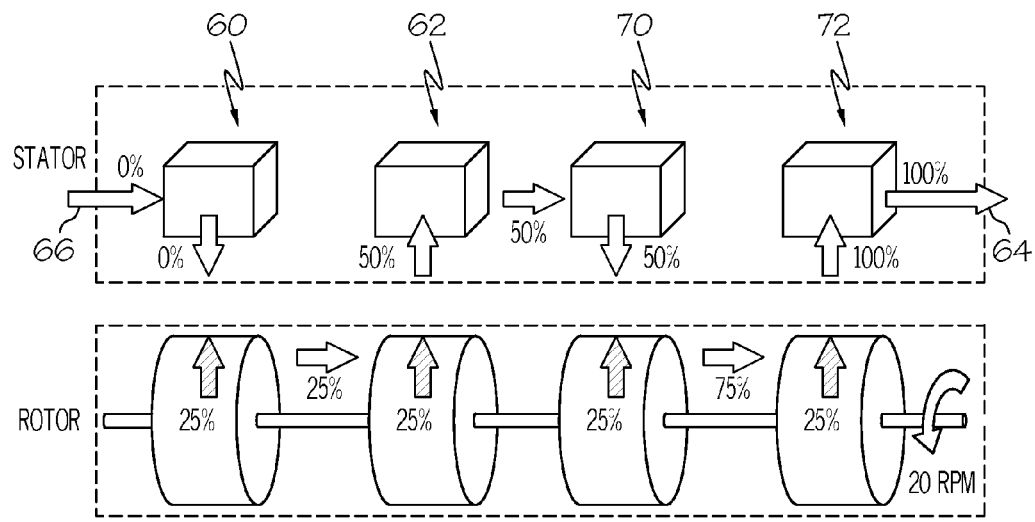
FIG. 8 is a graphical representation of showing generator power flow through multiple stages in a power generation system having 90 poles and operating at a shaft speed of 20 rpm, according to another embodiment of the present invention.
Figure 10:
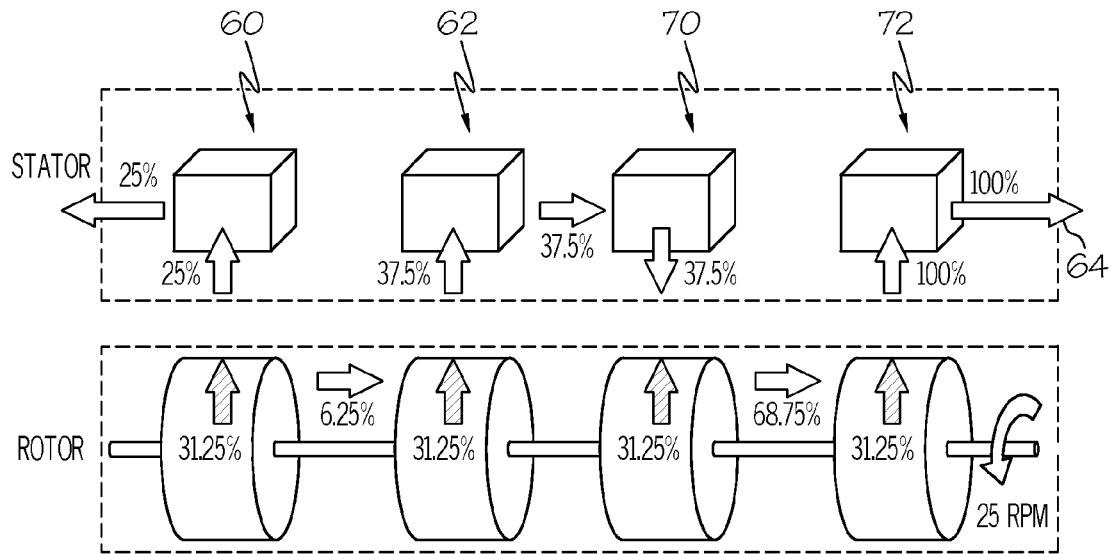
FIG. 10 is a graphical representation of showing generator power flow through multiple stages in a power generation system having 90 poles and operating at a shaft speed of 25 rpm, according to another embodiment of the present invention.

FIGS. 6, 8 and 10 show the generator power levels corresponding to shaft speeds of 15 rpm, 20 rpm and 25 rpm, respectively, such that for all these speeds the output power 64 at the main output of the generator may be rated power (100%). In these examples, each stage of the generator has 90 poles.

According to one aspect of the present invention, a first generator stage 60 (see FIGS. 5 and 6) may have to provide a maximum of 25% electrical power to a second stage 62 under the worst case condition—at a minimum speed of 15 rpm. The excitation power required by the first generator stage 60 (or by the second stage 62) can be obtained from the output power 64 of the generator by routing back into the excitation (as shown by arrow 66) some of the total power produced by the generator. Because of this, the overall rating of the multistage generator can be 125% instead of 100%, as shown in the examples of FIGS. 6, 8 and 10.

Referring to FIGS. 5 and 6, four exemplary generator stages (first stage 60, second stage 62, third stage 70 and fourth stage 72) may be used to create electrical power. Each of the four stages may have 90 poles which, at 15 rpm, would generate 11.25 Hertz (Hz) across the air gap. A wavy line 74 connecting either the stators or rotors of adjoining stages (for example, the wavy line 74 joining the rotor 60a of the first stage 60 and the rotor 60b of the second stage 62) refers to an electrical connection between the respective components. As shown in the Figures, the generator frequency (FIG. 5) and the generator power flow (FIG. 6) may result in a controlled frequency 60 Hz output power that may be delivered directly to the power grid without the need for intervening power electronics between the generator output (fourth stage) and grid.

Figure 11:
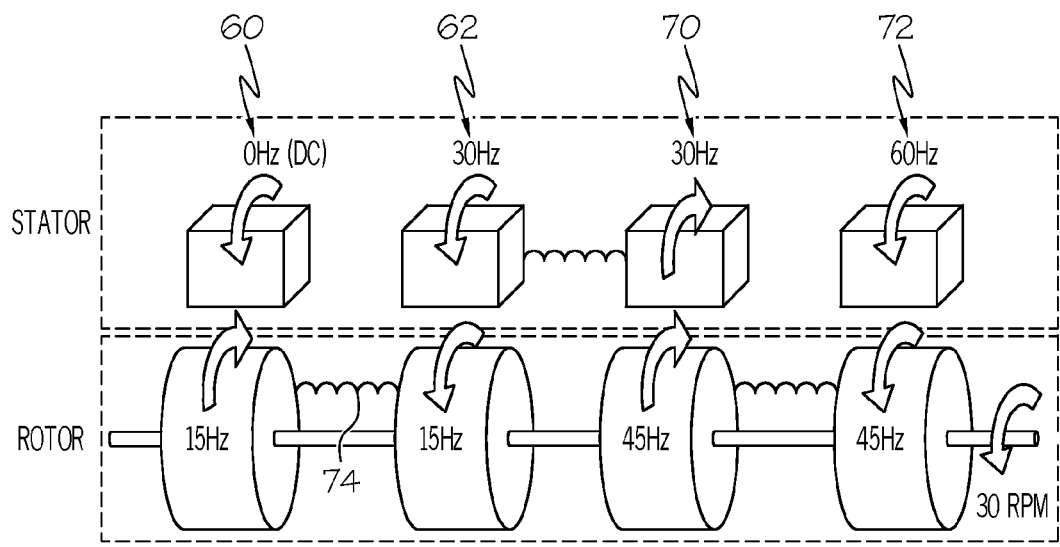
FIG. 11 is a graphical representation of showing generator frequencies through multiple stages in a power generation system having 60 poles and operating at a shaft speed of 30 rpm, according to another embodiment of the present invention.
Figure 13:
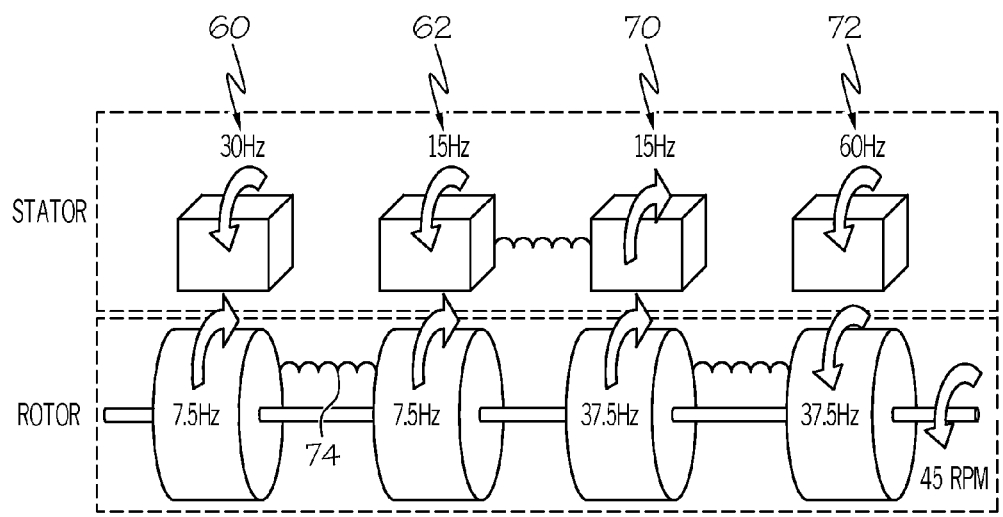
FIG. 13 is a graphical representation of showing generator frequencies through multiple stages in a power generation system having 60 poles and operating at a shaft speed of 45 rpm, according to another embodiment of the present invention.
Figure 15:
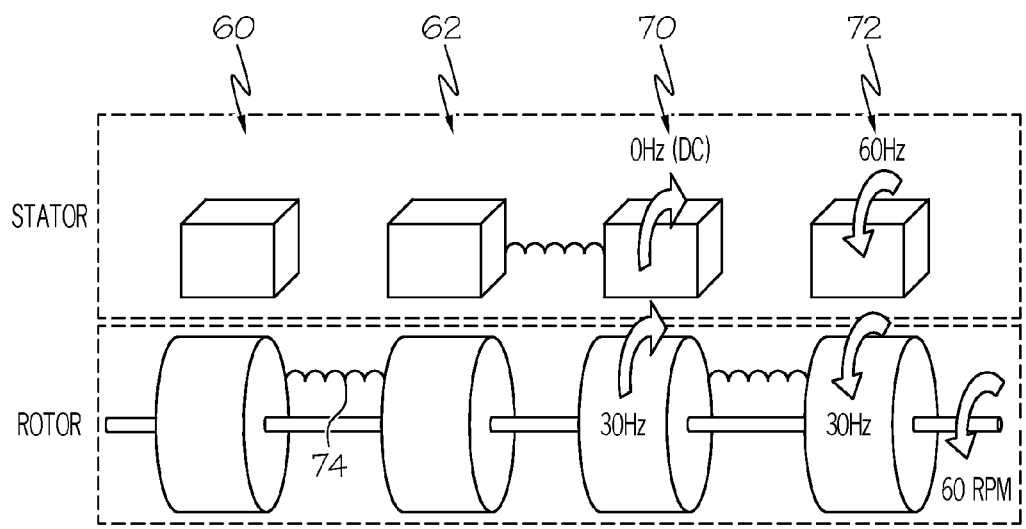
FIG. 15 is a graphical representation of showing generator frequencies through multiple stages in a power generation system having 60 poles and operating at a shaft speed of 60 rpm, according to another embodiment of the present invention.

FIGS. 11, 13 and 15 show the generator frequencies corresponding to exemplary shaft speeds of 30 rpm, 45 rpm and 60 rpm, respectively, such that, for all these speeds, the output frequency 68 at the main output of the generator may be 60 Hz. In these examples, each stage of the generator has 60 poles.

Figure 12:
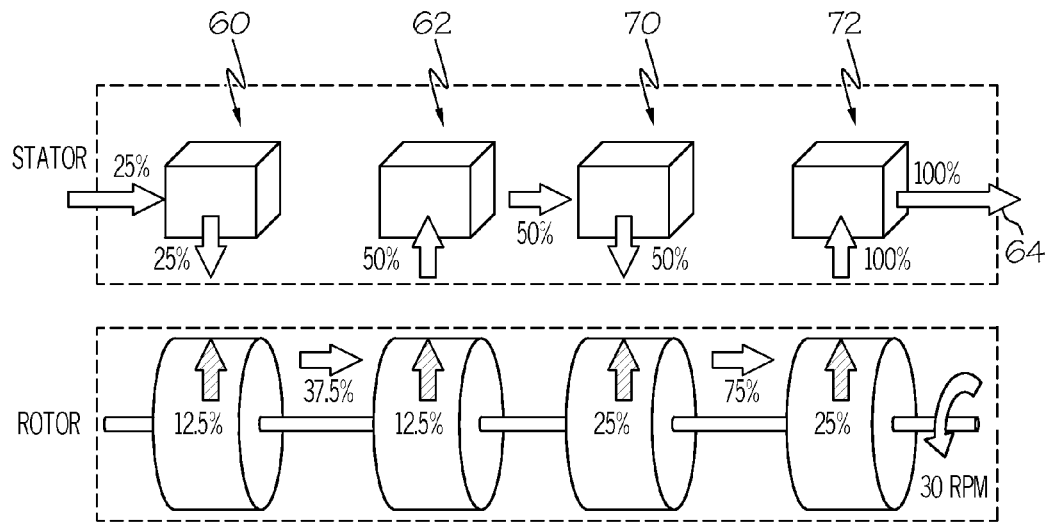
FIG. 12 is a graphical representation of showing generator power flow through multiple stages in a power generation system having 60 poles and operating at a shaft speed of 30 rpm, according to another embodiment of the present invention.
Figure 14:
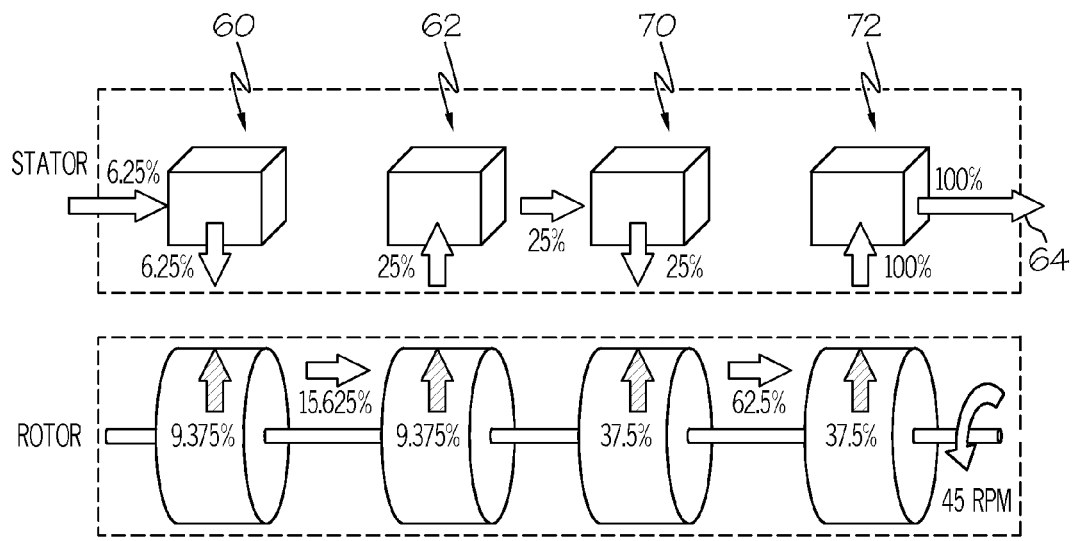
FIG. 14 is a graphical representation of showing generator power flow through multiple stages in a power generation system having 60 poles and operating at a shaft speed of 45 rpm, according to another embodiment of the present invention.
Figure 16:
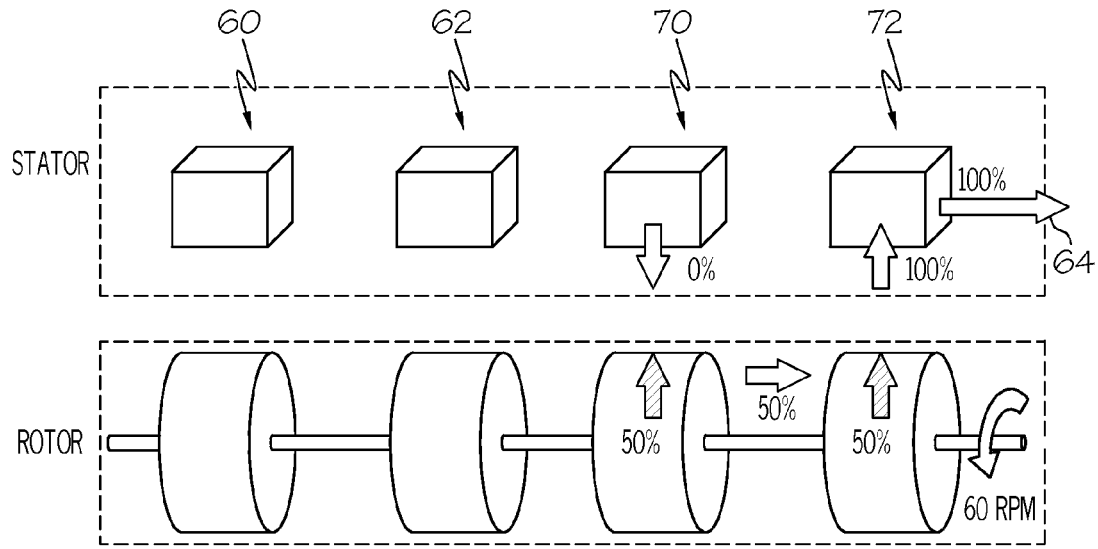
FIG. 16 is a graphical representation of showing generator power flow through multiple stages in a power generation system having 60 poles and operating at a shaft speed of 60 rpm, according to another embodiment of the present invention.
Figure 17:
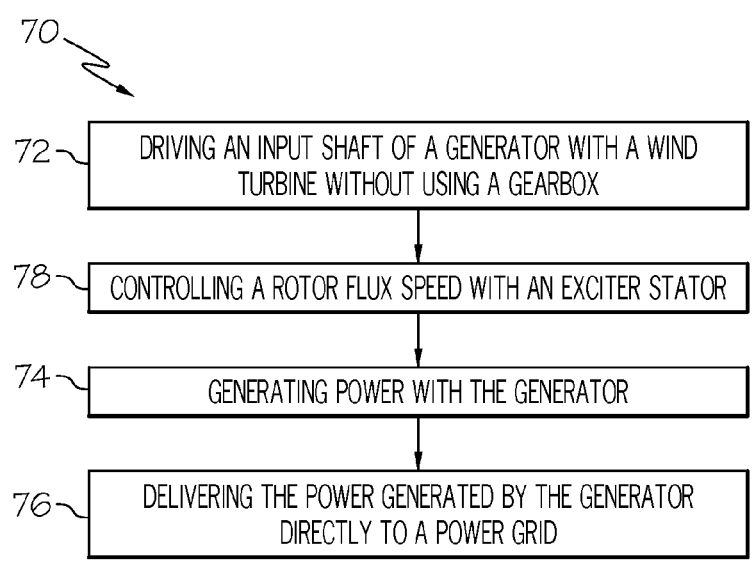
FIG. 17 is a flow chart describing a method for the generation of controlled frequency power according to an embodiment of the present invention.

FIGS. 12, 14 and 16 show the generator power levels corresponding to exemplary shaft speeds of 30 rpm, 45 rpm and 60 rpm, respectively, such that for all these speeds the output power 64 at the main output of the generator may be rated power (100%). In these examples, each stage of the generator has 60 poles. Table 1 shows an example of a weight and cost analysis and comparison of existing geared systems, existing direct-drive systems and the direct-drive system according to an embodiment of the present invention, for a 1.5 MW application. The data presented in this table confirms the current industry conclusion that the conventional geared system has lower weight and cost than the conventional direct-drive system. However, by comparing the direct-drive system according to an embodiment of the present invention with the conventional direct-drive system used today, it can be seen that significant weight and cost benefits can be realized. The weight and cost advantages of the direct-drive system according to an embodiment of the present invention may be more modest when compared with conventional geared system, but the reliability and operational life of the direct-drive system may be several times better.

Another important aspect of the direct-drive systems according to an embodiment of the present invention, as shown in the lower part of Table 1 (Units Installed in the Nacelle), is the lower cost and weight of the units installed in the nacelle of the direct-drive system vs. the two existing systems. The weight and cost of the main nacelle units are only about 50% of the conventional direct drive system. The nacelle weight and cost may be a critical element for wind turbines since it may influence the tower structure and installation cost.

TABLE 1

Comparison of Representative Wind Power Systems

Land Based Turbine Analysis - 1.5 MW

| Component | Conventional gearbox systems | | Conventional direct-drive systems | | Embodiment of the present invention | |
|---|---|---|---|---|---|---|
| | Cost ($1000) | Mass (Kg) | Cost ($1000) | Mass (Kg) | Cost ($1000) | Mass (Kg) |
| Rotor | 237 | 28,291 | 237 | 28,291 | 237 | 28,291 |
| Drive Train, Nacelle | 618 | 45,855 | 875 | 68,500 | 567 | 41,113 |
| Control, Safety | 35 | | 35 | | 35 | |

TABLE 1-continued

Comparison of Representative Wind Power Systems

Land Based Turbine Analysis - 1.5 MW

| Component | Conventional gearbox systems | | Conventional direct-drive systems | | Embodiment of the present invention | |
|---|---|---|---|---|---|---|
| | Cost ($1000) | Mass (Kg) | Cost ($1000) | Mass (Kg) | Cost ($1000) | Mass (Kg) |
| System Tower | 147 | 97,958 | 177 | 115,000 | 147 | 97,958 |
| Totals: | 1037 | 172,104 | 1324 | 211,791 | 986 | 167,362 |
| Specific Components Installed in the Nacelle | | | | | | |
| Gearbox | 53 | 10,241 | 0 | 0 | 0 | 0 |
| Generator | 98 | 5,501 | 300 | 30,000 | 200 | 11,000 |
| Variable Speed Electronics | 19 | 2,000 | 300 | 5,000 | 119 | 2,000 |

As can be seen from the above Table, the direct-drive controlled frequency generation system according to an embodiment of the present invention may decrease the cost of the generator and power conversion electronics compared to current direct drive systems by about 40%. In addition, the direct-drive controlled frequency generation system according to an embodiment of the present invention may increase the generator and power conversion electronics time between scheduled maintenance by 2-4 times and increase the life of the wind turbines by 3-4 times compared to current gearbox driven systems.

Referring now to FIG. 16, there is shown a flow chart describing a method 70 for the generation of controlled frequency power. The method 70 may include a step 72 of mechanically driving an input shaft (i.e., generator shaft 38) of a generator. For a 1 MW or 1.5 MW generating system the input shaft of the generator may be typically driven between about 15 and about 25 rpm. In one embodiment of the present invention, a wind turbine is used to directly drive the input shaft without an intervening gearbox. The method 70 may further include a step 74 of generating power with the generator. This step 74 may include generating power in a first stage of, the generator followed by generating power in a second stage of the generator, wherein the first and the second generator stages are electrically connected to provide an output that has a frequency that may be connected directly, as in step 76, without power conversion electronics, to the power grid. The method 70 may further include a step 78 of controlling a rotor flux speed with an exciter stator. This may be done with, for example, an exciter controller (i.e., electrical controller 55 in FIG. 4A). In one embodiment of the present invention, the exciter controller may use a portion of the power produced by the generator itself to supply power to the exciter stator, thereby controlling the flux speed in the exciter rotor.

It should be understood, of course, that the foregoing relates to exemplary embodiments of the invention and that modifications may be made without departing from the spirit and scope of the invention as set forth in the following claims.

We claim:

1. A direct-drive controlled frequency generator comprising:
    at least two stages electrically interconnected to control an output frequency of the generator; wherein
    each of the two stages of the generator includes exciter stator windings and main stator windings, and exciter rotor windings and main rotor windings, wherein the exciter rotor windings are electrically coupled with the main rotor windings,
    the generator has a variable shaft speed, and wherein
    the generator produces a controlled frequency power output.

2. The generator of claim 1, further comprising two or more additional stages electrically interconnected to control the output frequency of the generator.

3. The generator of claim 1 wherein the output of the generator is connected directly to a power grid, without any intervening power electronics therebetween.

4. The generator of claim 1, wherein the output frequency of the generator is controlled.

5. The generator of claim 1, further comprising an electronic controller for controlling the flux at an exciter stator of at least one of the stages.

6. The generator of claim 1, wherein an exciter generator and a main generator rotor windings of the at least two stages are electrically connected together.

7. The generator of claim 6, wherein an exciter generator and a main generator rotor windings of the at least two stages are electrically connected together directly without an intermediate rectifier bridge therebetween.

8. The generator of claim 6, wherein the exciter generator and the main generator rotor windings have at least two phases which are 90 degrees apart in space and 90 degrees shifted electrically.

9. The generator of claim 6, wherein the exciter generator and the main generator rotor windings have any multiphase winding configuration that can produce a rotating flux.

10. The generator of claim 1, wherein the shaft is driven by a wind-powered turbine.

11. A wind powered electricity generation apparatus comprising:
    a wind turbine driving a generator shaft;
    a generator having at least two generator stages having rotors rotationally attached to the generator shaft, wherein each of the two stages of the generator includes exciter stator windings and main stator windings, and exciter rotor windings and main rotor windings, wherein the exciter rotor windings are electrically coupled with the main rotor windings; and
    an output from the generator connected directly to a power grid.

12. The apparatus of claim 11, further comprising an electronic controller for controlling the flux at the exciter stator winding of at least one of the stages.

13. The apparatus of claim 11, further comprising two or more additional stages having rotors rotationally attached to the generator shaft and electrically interconnected to control the output frequency of the generator.

14. The generator of claim 13, wherein the exciter generator and the main generator rotor windings have any multiphase winding configuration that can produce a rotating flux.

15. The apparatus of claim 11, wherein the wind turbine directly drives the generator shaft without a gearbox.

16. A method for the generation of controlled frequency power, the method comprising:
    driving an input shaft of a generator directly with a wind turbine, wherein the generator includes at least two electrically connected stages, wherein each of the two stages of the generator includes exciter stator windings and main stator windings, and exciter rotor windings and main rotor windings, wherein the exciter rotor windings are electrically coupled with the main rotor windings;
    generating power with the generator; and
    delivering the power generated by the generator directly to a power grid.

17. The method of claim 16, further comprising controlling a rotor flux speed by using an exciter stator.

18. The method of claim 17, further comprising obtaining excitation power for at least one stage of the generator from the power generated by the generator.

* * * * *